(12) United States Patent
Maurer et al.

(10) Patent No.: US 8,234,071 B2
(45) Date of Patent: Jul. 31, 2012

(54) LATEROLOG SHUNT MEASUREMENT

(75) Inventors: Hans-Martin Maurer, Houston, TX (US); Dinesh P. Shah, Houston, TX (US); Rashid W. Khokhar, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 369 days.

(21) Appl. No.: 12/557,032

(22) Filed: Sep. 10, 2009

(65) Prior Publication Data

US 2010/0070181 A1  Mar. 18, 2010

Related U.S. Application Data

(60) Provisional application No. 61/095,991, filed on Sep. 11, 2008.

(51) Int. Cl.
*G01V 3/10* (2006.01)
*G01V 3/02* (2006.01)
*G01V 3/18* (2006.01)
*G01V 3/20* (2006.01)

(52) U.S. Cl. .................. 702/7; 702/6; 702/9; 702/11

(58) Field of Classification Search .................. 702/7, 9, 702/11, 13, 50, 85, 106, 179, 182; 219/772; 324/374

See application file for complete search history.

(56) References Cited

U.S. PATENT DOCUMENTS

| 3,772,589 A | 11/1973 | Scholberg |
| 4,588,951 A | 5/1986 | Ohmer |
| 4,594,552 A | 6/1986 | Grimaldi et al. |
| 4,692,707 A * | 9/1987 | Locke et al. .................. 324/374 |
| RE32,564 E | 12/1987 | Scholberg |
| 7,091,460 B2 * | 8/2006 | Kinzer .......................... 219/772 |

OTHER PUBLICATIONS

Single-Trip Completion Maximies Deliverability and Longevity-Case Study: ConocoPhillips Indonesia selects a three-zone perforation and sand-control completion approach to cap development costs. Schlumberger. Oct. 2007. www.slb.com/completions.

* cited by examiner

*Primary Examiner* — Michael Nghiem
*Assistant Examiner* — Felix Saurez
(74) *Attorney, Agent, or Firm* — Cantor Colburn LLP

(57) ABSTRACT

An apparatus for estimating a property of a formation penetrated by a borehole, the apparatus having: a first electrode and a second electrode configured to couple to a characteristic impedance of a material disposed in the borehole; a third electrode configured with the first electrode to electrically couple to a characteristic impedance of the formation; a circuit element coupled to the first electrode and to the second electrode and having a characteristic impedance; a first sensing circuit coupled to the circuit element and configured to provide a first signal related to the impedance of the borehole material; and a second sensing circuit coupled to the first electrode and the third electrode and configured to provide a second signal related to the characteristic impedance of the formation; wherein the first signal and the second signal are used to estimate the property. A method is also provided.

19 Claims, 5 Drawing Sheets

LATEROLOG SHUNT MEASUREMENT

CROSS-REFERENCE TO RELATED APPLICATIONS

This application claims the benefit of U.S. Provisional Application Ser. No. 61/095,991, entitled "Laterlog Shunt Measurement", filed Sep. 11, 2009, under 35 U.S.C. §119(e), and which is incorporated herein by reference in its entirety.

BACKGROUND OF THE INVENTION

1. Field of the Invention

The invention disclosed herein relates to oil and gas exploration and, in particular, to a circuit design for implementing a resistivity measuring device.

2. Description of the Related Art

A variety of technologies is used for oil and gas exploration. One such technology evaluates electrical properties of sub-surface materials and formations. Instruments implementing such technology are commonly referred to as "resistivity" instruments.

Typically, resistivity instruments are either lowered into a borehole that has previously been drilled into the earth, or incorporated into a drilling apparatus. Often, some supply of drilling mud is introduced into the borehole. The drilling mud, provided to tamp down pressure from below, may be oil based mud or non-oil (e.g., water) based mud. Each type of mud may present particular concerns to users implementing resistivity measuring technologies due to varying natures of conductivity.

The various electrode designs presently in use in resistivity instruments involve a variety of configurations. Each of the various configurations has been developed to address some deficiency of prior designs. One continuing problem is the incorporation of a systematic error in measurements of apparent resistivity. The error can be large if the resistivity of the mud, $R_m$, is very low.

An exemplary instrument for making resistivity measurements is available from Baker Hughes, Incorporated of Houston, Tex. The instrument, referred to as an "Earth Imager," has provided for a variety of resistivity images.

With regard to the exemplary instrument, reference may be had to FIG. 1. In FIG. 1, there is shown a depiction of the prior art instrument 21 for performing resistivity imaging. In this example, the instrument 21 is disposed within a wellbore 11 (also referred to as a "borehole"). The instrument 21 includes pads 3 mounted on articulating arms 2. The articulated pads 3 are typically pressed up against a wall of the wellbore 11 and make firm contact therewith. Current I flows from at least one transmitter electrode 6 on the pad 3 to at least one return electrode 4. The return electrode 4 is electrically separated from each transmitter electrode 6 by an insulator 5. The current I is typically alternating current (AC) (and, therefore it is recognized that the current I actually flows in two directions as polarity changes).

In a variety of embodiments, the transmitter electrode 6 is accompanied by at least one guard electrode 7. The guard electrode 7 is provided to drive measuring current into the formation 10, thus preventing or limiting measuring current from flowing along the wellbore 11. Unfortunately, current from the guard electrode 7 may also enter the measuring current, and cause systematic measurement error. As discussed above, variations of this instrument 21 and others may be used in drilling apparatus to perform measurements while drilling.

Therefore, what are needed are methods and apparatus relating to a resistivity instrument that reduces systematic error in results for measurements of apparent resistivity. Preferably, the methods and apparatus include capabilities to correct systematic errors arising during measurement processes.

BRIEF SUMMARY OF THE INVENTION

Disclosed is an apparatus for estimating a property of a formation penetrated by a borehole, the apparatus having: a carrier configured to be conveyed through the borehole; a first electrode disposed at the carrier; a second electrode disposed at the carrier, the first electrode and the second electrode being configured to couple to a characteristic impedance of a material disposed in the borehole; a third electrode disposed at the carrier, the first electrode and the third electrode being configured to electrically couple to a characteristic impedance of the formation; a circuit element coupled to the first electrode and to the second electrode and having a characteristic impedance; a first sensing circuit coupled to the circuit element and configured to provide a first signal related to the impedance of the borehole material; and a second sensing circuit coupled to the first electrode and the third electrode and configured to provide a second signal related to the characteristic impedance of the formation; wherein the first signal and the second signal are used to estimate the property.

Also disclosed is a method for estimating a property of a formation penetrated by a borehole, the method including: providing a first current from a first electrode to a second electrode via a circuit element coupled to the first electrode and the second electrode, the first electrode and the second electrode being configured to couple to a characteristic impedance of a material disposed in the borehole; measuring a first signal with a first sensing circuit coupled to the circuit element, the first signal being related to the impedance of the borehole material; providing a second current from the first electrode to a third electrode, the first electrode and the third electrode being configured to couple to a characteristic impedance of the formation; measuring a second signal with a second sensing circuit coupled to the first electrode and the third electrode; and using the first signal and the second signal to estimate the property.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
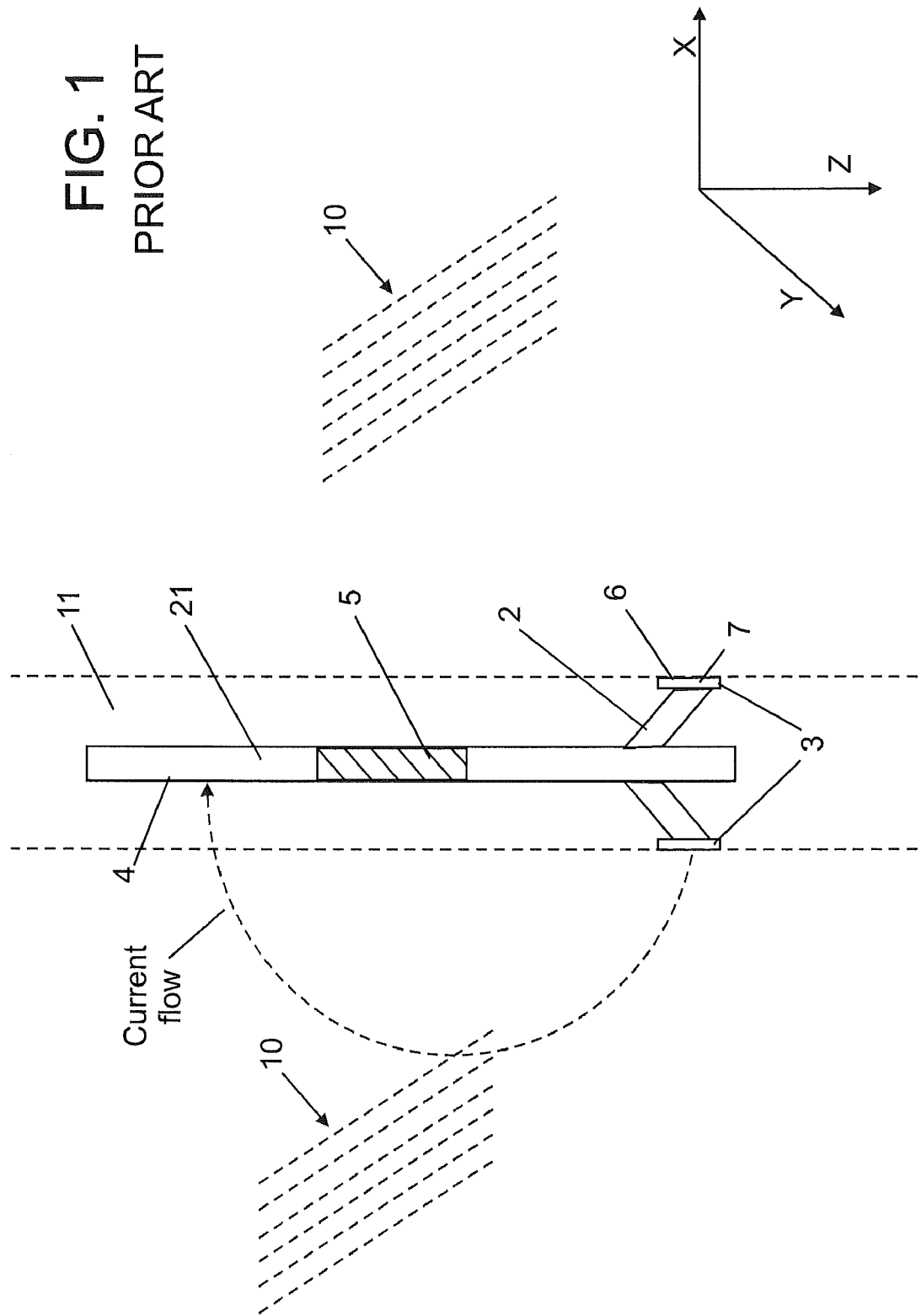
FIG. 1 depicts aspects of a prior art resistivity instrument.

Disclosed are techniques for identifying and correcting systematic error in resistivity measurement data, where the measurements are taken downhole by a sensor that includes at least one transmitter electrode 6, at least one return electrode 4 and at least one guard electrode.

First, some definitions are provided for clarity. As discussed herein, the term "formation" and other similar terms generally refer to sub-surface materials that are located within a survey volume. That is, a "formation" is not limited to geologic formations as such, and may generally include any materials found downhole. As noted above, it is recognized that by using alternating current (AC), that the terminology "transmitter" and "return" with regard to the electrodes generally relate to operation of the sensor at some instant in time. That is, by using AC, it is recognized that current flow will generally travel in both directions between the electrodes. As used herein, the term "real-time" generally refers to a temporal context that is frequent enough for users to make meaningful decisions such as operational decisions where logging routines may be adjusted according to data provided. The terms used herein are adopted for convention and purposes of illustration and are not to be construed as limiting of the invention.

The embodiments presented herein use the terms "resistivity" and/or "resistor" for discussion purposes. Resistivity is the real component of impedance, which is a complex number having a real component and an imaginary component. Thus, the embodiments presented using the terms resistivity and/or resistor represent embodiments using one type or form of impedance. It is noted that the term "impedance" (represented by Z) may be substituted for the terms "resistivity" and/or "resistor" in the text, equations, and figures presented herein. Accordingly, in place of or in addition to a resistance component, an impedance may include an inductance or a capacitance component. In one example, in lieu of measuring a formation resistance, an induction coupling may be measured.

As some perspective, consider that resistivity instruments, such as a galvanic instrument, generally focus a current "beam" into a formation using at least one guard electrode. The goal is to create a constant potential, V, along the instrument 21 in order to prevent currents, I, from flowing along the wellbore 11 in the conductive mud. Generally, the size of the guard electrode 7 determines the depth of investigation (distance from a centerline of the wellbore 11).

In one embodiment (not shown), the transmitter electrode 6 includes a central measuring electrode, $A_0$, (i.e., the at least one transmitter electrode 6) with two guard electrodes, $A_1$ and $A_1'$, with one guard electrode disposed above the measuring electrode and the other guard electrode disposed below the measuring electrode. In this embodiment, all three electrodes are energized by a single source, and generally drive current to the at least one return electrode 4 that is far away (refer again to the instrument 21 shown in FIG. 1).

In order to calculate resistivity, the voltage of the transmitter electrode, $A_0$, (with respect to a reference electrode located far away) and the current, I, have to be measured. However, in practice, the transmitter electrode, $A_0$, is connected to the guard electrode, $A_1$, with a small resistor, $R_c$. Accordingly, the transmitter electrode, $A_0$, and the guard electrode, $A_1$, are kept at essentially the same potential, V, while users are able to measure current, I, flowing from the transmitter electrode, $A_0$.

Figure 2:
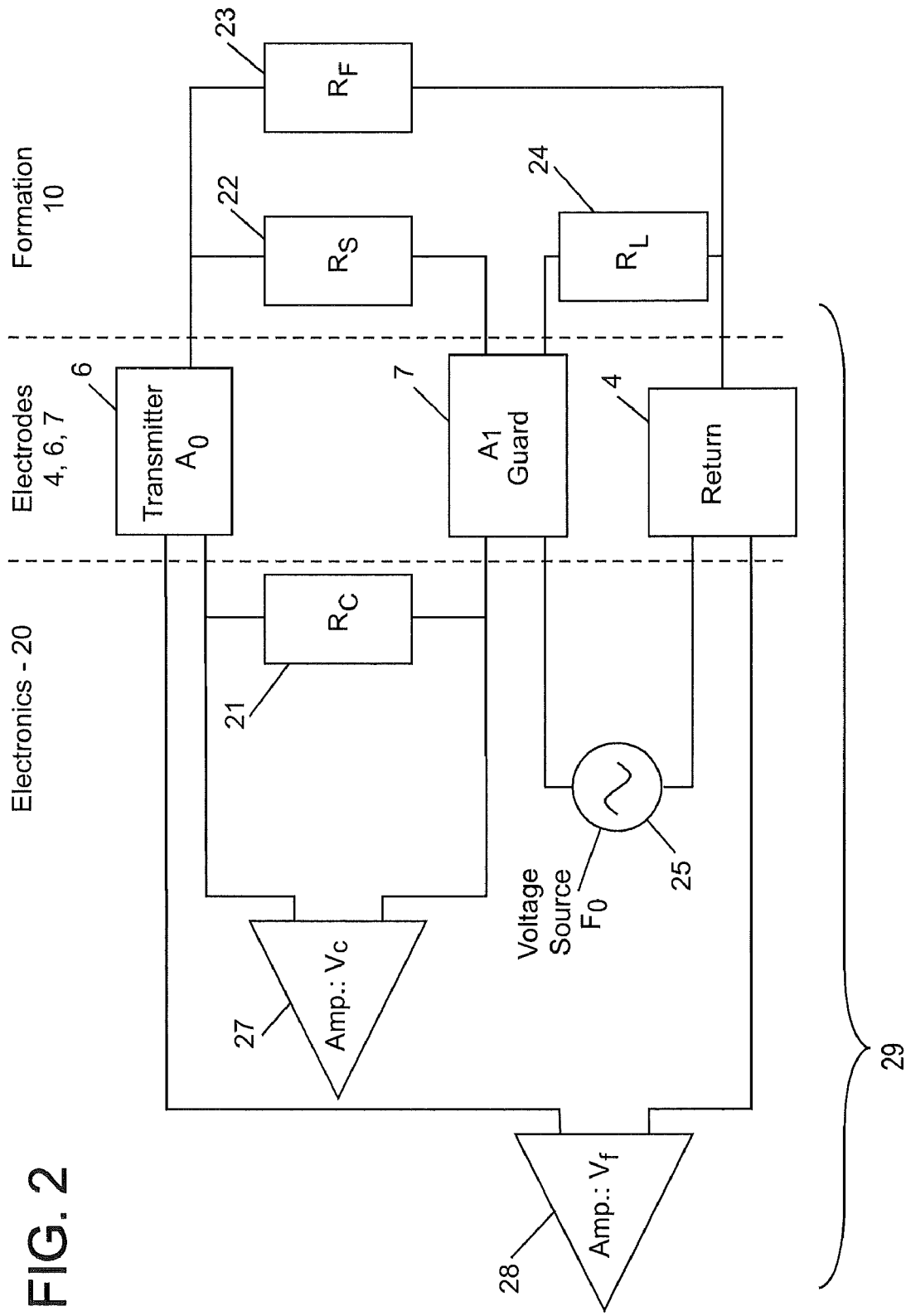
FIGS. 2, 3 and 5 depict aspects of embodiments of circuits employing the teachings herein.

The advantages provided include a simple response characteristic and simple electrode configuration. These principle design elements may be applied to a variety of resistivity measuring devices, including galvanic pad devices exhibiting a shallow depth of investigation. Refer now to FIG. 2 for a circuit diagram of an exemplary embodiment of a sensor.

In FIG. 2, an embodiment of a sensor 29 is depicted. In this embodiment, the sensor 29 includes an electronics unit 20, a plurality of electrodes (which include, for example, the return electrode 4, at least one guard electrode 7 and at least one transmitter electrode 6). Aspects of the formation 10 are also depicted. That is, the formation 10 is shown as exhibiting a mud shunt resistor (i.e., resistance), $R_s$, 22, a formation resistor, $R_F$, 23 and a return resistor, $R_L$, 24. More specifically, a resistance value, $R_s$, may be associated with resistive properties of a material disposed in the borehole 11 such as the drilling mud. Another resistance value, $R_F$, may be associated with resistive properties of the formation 10. Another resistance value, $R_L$, may be associated with resistive properties of the materials near the return electrode 4.

In this example, a voltage source 25 is disposed between the at least one guard electrode 7 and the return electrode 4. A small current measurement resistor, $R_c$, 21 is included within sensor 29, and is disposed between the at least one guard electrode 7 and the at least one transmitter electrode 6. A first amplifier 27 provides for measuring of a voltage drop across the current measurement resistor, $R_c$, 21. A second amplifier 28 provides for measuring of a voltage drop across the formation 10 (i.e., between the at least one transmitter electrode 6 and the return electrode 4).

Figure 4:
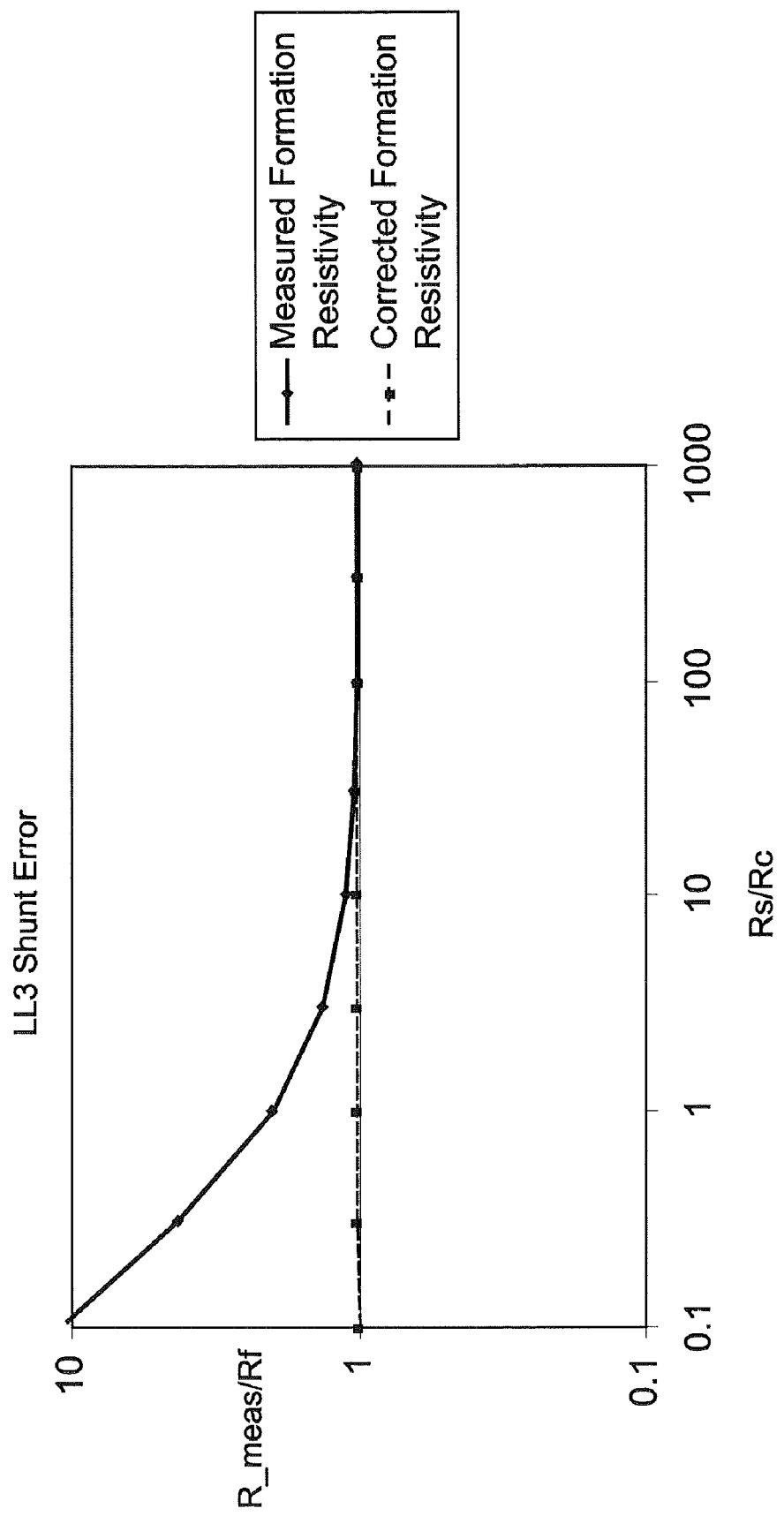
FIG. 4 graphically depicts a reduction in measurement error that results from employing the teachings herein.

A voltage source 25 drives a current, I, between the at least one guard electrode 7 and the at least one return electrode 4 through the return resistor, $R_L$, 24. The at least one transmitter electrode 6 is connected to the at least one guard electrode 7 by the current measurement resistor, $R_c$, 21. Thus, the formation resistor, $R_F$, 23 provides a path for the current, I, to flow from the at least one transmitter electrode 6 to the at least one return electrode 4. The shunt resistor, $R_s$, 22, provides a path between the at least one transmitter electrode 6 to the at least one guard electrode 7 through the drilling mud and is in parallel to the current measurement resistor, $R_c$, 21. The voltage source 25 drives the current, I, using a first frequency, $f_0$. Reference may be had to Table 1. Table 1 shows a percentage error in formation resistance estimation for an embodiment of the sensor 29 where three electrodes are used (i.e., two guard electrodes 7 and one transmitter electrode 6). Table 1 provides formation resistance as determined by conventional calculation and corrected using the shunt measurement. The data of Table 1 are depicted graphically in FIG. 4.

TABLE 1

Error Estimations

| $R_c$ | $R_F$ | $R_s/R_c$ | $R_F$ conventional calculation | Corrected $R_F$ after three iterations |
|---|---|---|---|---|
| 0.1 | 1 | 0.1 | 11.000 | 1.000 |
|  |  | 0.31 | 4.226 | 1.000 |
|  |  | 1 | 2.000 | 1.000 |
|  |  | 3.1 | 1.323 | 1.000 |
|  |  | 10 | 1.100 | 1.000 |
|  |  | 31 | 1.032 | 1.000 |
|  |  | 100 | 1.010 | 1.000 |
|  |  | 310 | 1.003 | 1.000 |
|  |  | 1000 | 1.001 | 1.000 |

Figure 3:
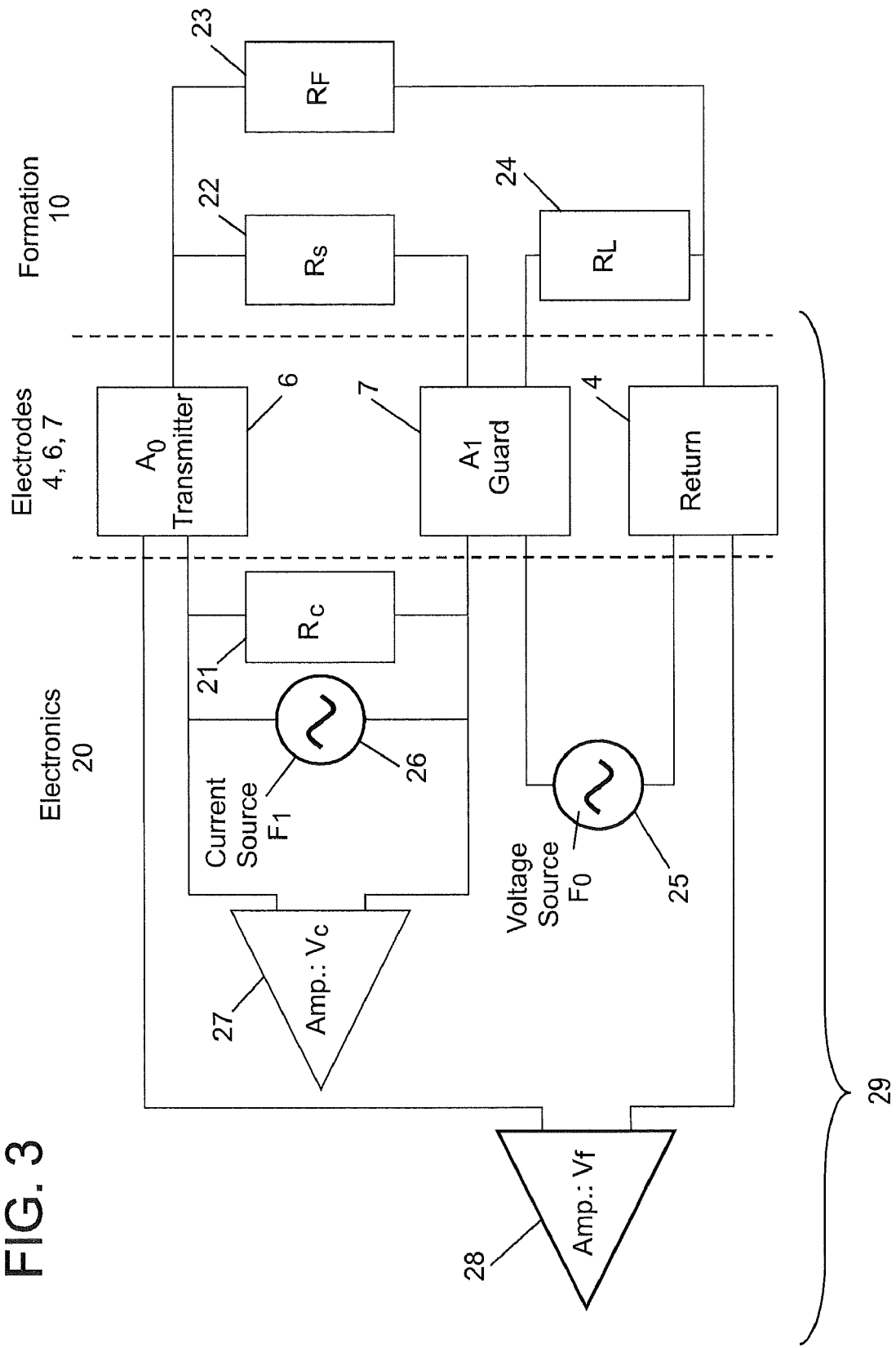

Now with reference to FIG. 3, another embodiment provides for correcting distortion caused by the drilling mud and represented by the drilling mud shunt resistor, $R_s$, 22. In this example, an additional current source 26, operating at another frequency, $f_1$, (i.e., a frequency that is generally distinct or at least discernable from the first frequency, $f_0$, of the voltage source 25) is connected in parallel with the current measurement resistor, $R_c$, 21. As a current source, the additional current source 26 has a high impedance for all frequencies except the another frequency, $f_1$. With the additional current source 26, the current flow of the voltage source 25 at frequency $f_0$ is not disturbed. The voltage across the current measurement resistor, $R_c$, 21, has already been measured at the first frequency, $f_0$, so the measurement may be used to extract the voltage across the current measurement resistor, $R_c$, 21 at the another frequency, $f_1$, by a Fourier transform.

Figure 5:
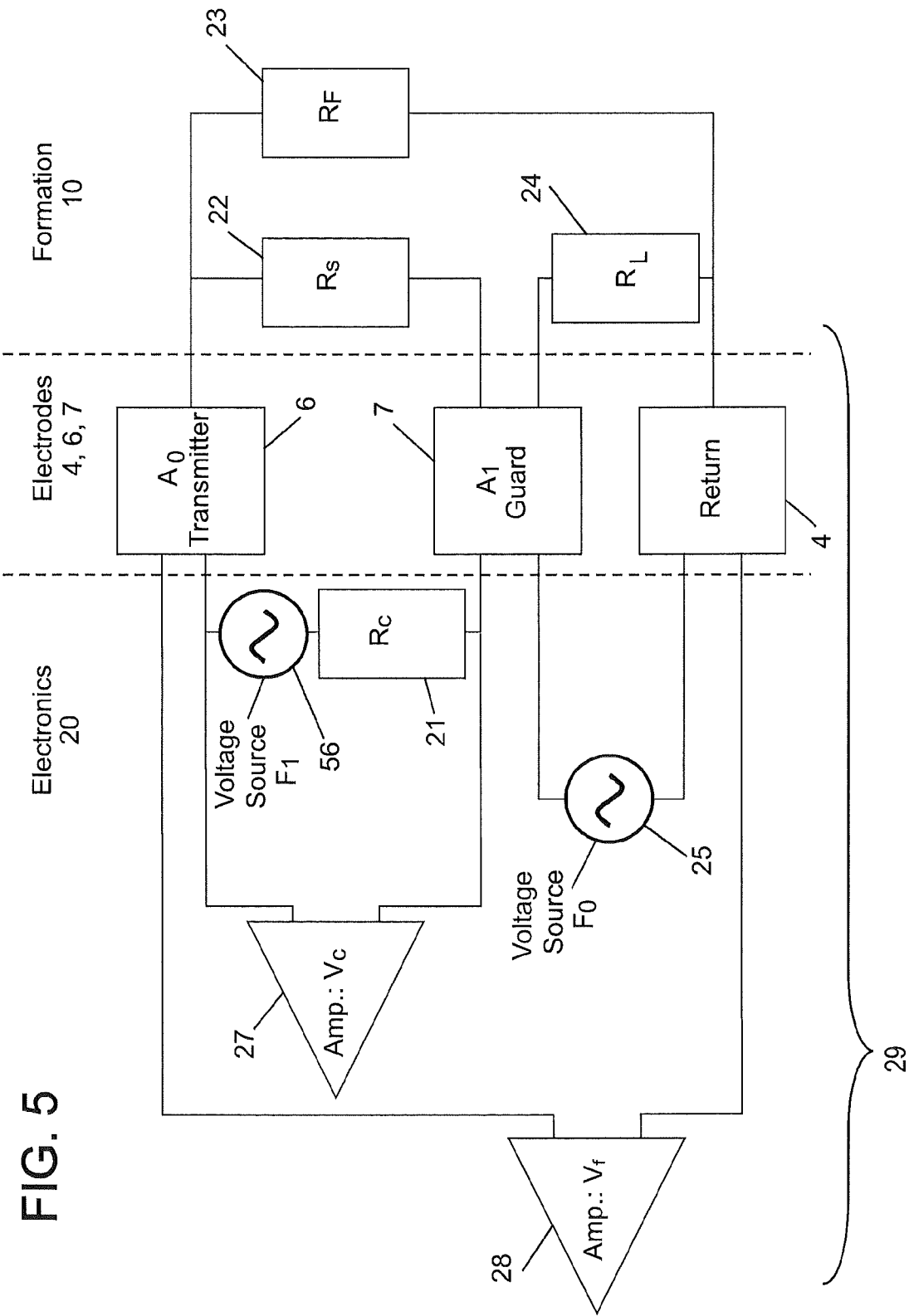

In another embodiment, provided in FIG. 5, an additional voltage source 56 operating at another frequency, $f_1$, is connected in series with the current measurement resistor, $R_c$, 21. As a voltage source, the additional voltage source 56 has very low impedance for all frequencies except the another frequency, $f_1$, and the current flow of the first voltage source 25 at frequency $f_0$ is not disturbed. As the voltage across the current measurement resistor, $R_c$, 21 is already measured at the first frequency, $f_0$, the same measurement may be used to extract the voltage across the current measurement resistor, $R_c$, 21 at the another frequency, $f_1$, by use of a Fourier transform.

Now in greater detail, aspects of the various embodiments are described in mathematical relationships. First, consider that known quantities include the resistance of the current measurement resistor, $R_c$, 21 as well as the current output of the current source 26, $I_1$. Accordingly, measured values include:

$V_{0f}$ of which represents voltage across formation resistor, $R_f$, at the first frequency, $f_0$;

$V_{0c}$ which represents voltage across the current measurement resistor, $R_c$, at the first frequency, $f_0$; and $V_{1c}$ which represents voltage across the current measurement resistor Rc at the another frequency, $f_1$.

The current, $I_{0c}$, of the first frequency, $f_0$, through resistor $R_c$, is given as:

$$I_{0c} = \frac{V_{0c}}{R_c}$$

The source load resistance for the current source 26, at the another frequency, $f_1$, is given as:

$$R_{1M} = \frac{V_{1c}}{I_1}$$

The conventional formation resistance calculation is the initial estimate of the iteration:

$$Rf_0 = \frac{V_{0f}}{I_{0c}} = \frac{V_{0f}}{V_{0c}} * R_c$$

Using this formation resistor, a first shunt resistance can be calculated as:

$$R_{s0} = \frac{R_{1M} * R_c * R_{f0}}{R_c * R_{f0} - R_{1M} * R_{f0} - R_{1M} * R_c}$$

The shunt resistor allows to correct the value of the formation resistor as provided:

$$R_{f1} = \frac{V_{0f}}{V_{0c}} * \frac{R_c * R_{s0}}{R_c + R_{s0}}$$

After three to four iterations, a good correction of the formation resistance, $R_f$, can be achieved. Note that the error in the corrected $R_f$ is linear with respect to the error in h. It does not depend on the error in current measurement resistor, $R_c$, but the calculated shunt resistor, $R_s$, can be wrong (even negative).

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The instrument 21 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first," "second," and "third" are used to distinguish elements and are not used to denote a particular order.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of a formation penetrated by a borehole, the apparatus comprising:
a carrier configured to be conveyed through the borehole;
a first electrode disposed at the carrier;
a second electrode disposed at the carrier, the first electrode and the second electrode being configured to couple to a characteristic impedance of a material disposed in the borehole;
a third electrode disposed at the carrier, the first electrode and the third electrode being configured to electrically couple to a characteristic impedance of the formation;
a circuit element coupled to the first electrode and to the second electrode and having a characteristic impedance;
a first sensing circuit coupled to the circuit element and configured to provide a first signal related to the impedance of the borehole material; and
a second sensing circuit coupled to the first electrode and the third electrode and configured to provide a second signal related to the characteristic impedance of the formation;
wherein the first signal and the second signal are used to estimate the property.

2. The apparatus of claim 1, wherein the first signal and the second signal are used to estimate the characteristic impedance of the formation that is corrected for the borehole material.

3. The apparatus of claim 1, further comprising a first voltage source coupled to the second electrode and the third electrode and configured to apply voltage at a first frequency through the circuit element to the first electrode and the second electrode and to the first electrode and the third electrode, wherein the voltage is used to obtain the first and second signals.

4. The apparatus of claim 3, further comprising a current source disposed in parallel to the circuit element and configured to transmit a current at a second frequency between the first electrode and the second electrode, wherein the current is used to obtain another measurement of the first signal.

5. The apparatus of claim 3, further comprising a voltage source disposed in series with the circuit element and configured to apply a voltage at a second frequency to the first electrode and the second electrode, wherein the voltage is used to obtain another measurement of the first signal.

6. The apparatus of claim 1, wherein the second electrode is disposed between the first electrode and the third electrode and configured to drive current from the first electrode into the formation and to the third electrode.

7. The apparatus of claim 1, wherein the circuit element is at least one of a resistor, an inductor, and a capacitor.

8. The apparatus of claim 1, wherein the carrier is conveyed by at least one of a wireline, a slickline, coiled tubing, a drill string.

9. The apparatus of claim 1, further comprising a processor configured to receive the first signal and the second signal to estimate the property.

10. A method for estimating a property of a formation penetrated by a borehole, the method comprising:
providing a first current from a first electrode to a second electrode via a circuit element coupled to the first electrode and the second electrode, the first electrode and the second electrode being configured to couple to a characteristic impedance of a material disposed in the borehole;
measuring a first signal with a first sensing circuit coupled to the circuit element, the first signal being related to the impedance of the borehole material;
providing a second current from the first electrode to a third electrode, the first electrode and the third electrode being configured to couple to a characteristic impedance of the formation;
measuring a second signal with a second sensing circuit coupled to the first electrode and the third electrode; and
using the first signal and the second signal to estimate the property.

11. The method of claim 10, further comprising using a processor configured to receive the first signal and the second signal to estimate the property.

12. The method of claim 10, wherein the first current and the second current are provided at a first frequency.

13. The method of claim 12, further comprising providing a third current at a second frequency using a current source coupled in series with the circuit element to obtain another measurement of the first signal.

14. The method of claim 13, wherein an impedance of the sub-surface materials, $Z_{f0}$, is calculated as:

$$Z_{f0} = \frac{V_{0f}}{I_{0c}} = \frac{V_{0f}}{V_{0c}} * Z_c;$$

where:
$V_{0f}$ represents a potential difference across the formation between the first electrode and the second electrode;
$I_{0c}$ represents a current measured through the formation between the first electrode and the second electrode;
$V_{0c}$ represents a potential difference across the borehole material; and
$Z_c$ represents an impedance for the circuit element.

15. The method of claim 14, further comprising calculating a shunt impedance, $Z_{s0}$, as:

$$Z_{s0} = \frac{Z_{1M} * Z_c * Z_{f0}}{Z_c * Z_{f0} - Z_{1M} * Z_{f0} - Z_{1M} * Z_c};$$

where
$Z_{1M}$ represents an impedance of the current source.

16. The method of claim 15, wherein correcting comprises calculating an improved value of the impedance of the formation, $Z_{f1}$, as:

$$Zf_1 = \frac{V_{0f}}{V_{0c}} * \frac{Z_c * Z_{s0}}{Z_c + Z_{s0}}.$$

17. The method of claim 16, further comprising iteratively correcting the impedance of the formation, $Z_{f1}$.

18. The method of claim 13, further comprising applying a voltage at a second frequency using a voltage source coupled in parallel with the circuit element to obtain another measurement of the first signal.

19. The method of claim 10, wherein the estimating is performed in real-time.

* * * * *